United States Patent [19]

Vetter

[11] 4,165,357

[45] Aug. 21, 1979

[54] METHOD OF SHAPING PLASTICS FOILS

[75] Inventor: Arthur Vetter, Wolfertschwenden, Fed. Rep. of Germany

[73] Assignee: Multivac Sepp Haggenmuller KG, Wolfertschwenden, Fed. Rep. of Germany

[21] Appl. No.: 803,104

[22] Filed: Jun. 3, 1977

[30] Foreign Application Priority Data

Dec. 10, 1976 [DE] Fed. Rep. of Germany ... 7638759[U]

[51] Int. Cl.² ............................................. B29C 17/04
[52] U.S. Cl. ................................. 264/548; 264/522; 264/553; 264/294; 264/DIG. 66
[58] Field of Search ................. 264/92, 292, 548, 294, 264/522, 553, DIG. 66

[56] References Cited

U.S. PATENT DOCUMENTS

| | | | |
|---|---|---|---|
| 2,896,264 | 7/1959 | Natta et al. | 264/292 |
| 2,911,681 | 11/1959 | Distler | 264/292 |
| 2,985,915 | 5/1961 | Winstead | 264/292 |
| 3,091,946 | 6/1963 | Kesling | 264/92 X |
| 3,121,767 | 2/1964 | Welshon | 264/292 |
| 3,184,524 | 5/1965 | Whiteford | 264/292 X |
| 3,218,379 | 11/1965 | Edwards | 264/292 X |
| 3,220,544 | 11/1965 | Lovell | 264/292 X |
| 3,611,669 | 10/1971 | Shepherd | 264/292 X |
| 3,814,784 | 6/1974 | Wolf | 264/92 X |
| 3,947,539 | 3/1976 | Lane | 264/292 X |
| 4,016,231 | 4/1977 | Hawkins | 264/92 |

*Primary Examiner*—Philip Anderson
*Attorney, Agent, or Firm*—Pollock, Vande Sande & Priddy

[57] ABSTRACT

Plastics foil is shaped in a deep drawing apparatus by being placed in a mould, while the foil is below its deformation temperature, having heated wall surfaces and by applying a pressure differential to the foil so that it progressively stretches and contacts the mould wall. The progressive heating and stretching of the foil ensures that the corners of the moulded article are not thinner than the remaining portions of the moulded article, thus reducing the amount of plastics material necessary for an article of given strength.

6 Claims, 4 Drawing Figures

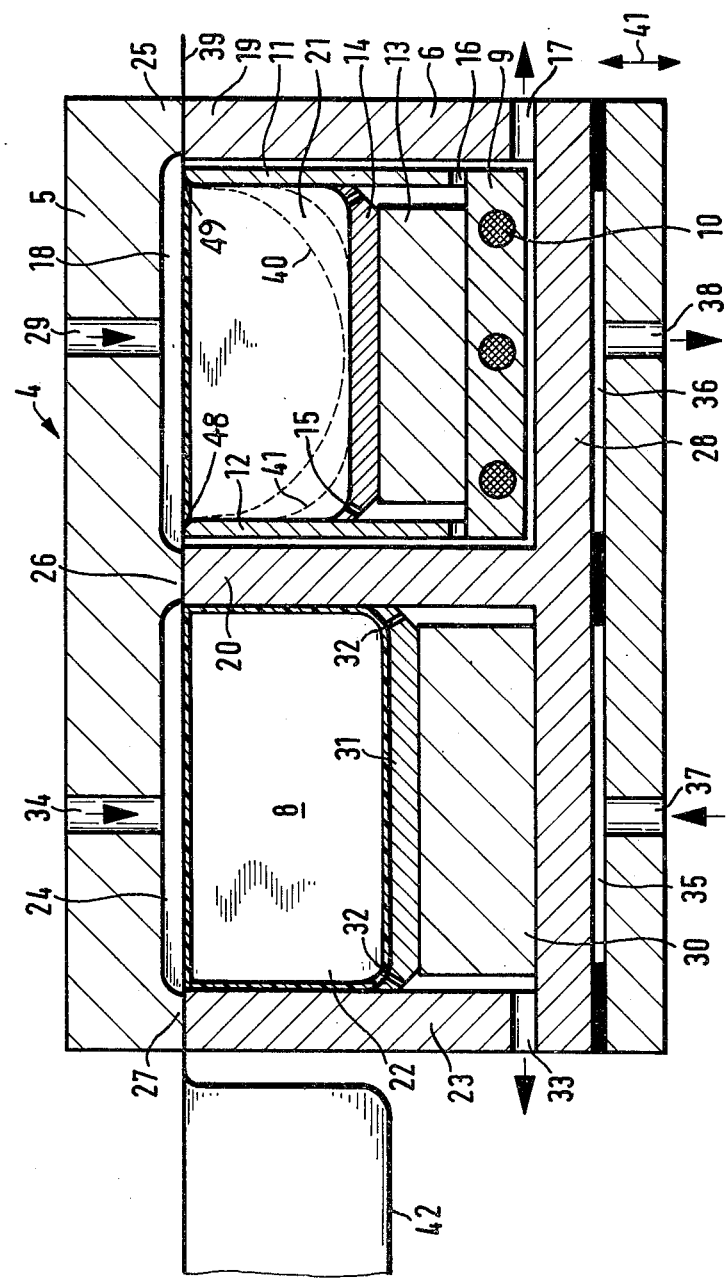

METHOD OF SHAPING PLASTICS FOILS

The invention relates to a method of shaping plastics foils, more specifically to a method of producing thermoplastic articles by shaping thermoplastic plastics foils.

Shaping of plastics foils especially takes place during packaging with thermoplastic foils. To this end the foil is first heated in a deep drawing tool by heat transfer from a heating plate. Subsequently the foil is sucked, by a fluid pressure difference into a mould opposite the heating surface, the mould not being pre-heated. The heated foil is stretched and stabilizes its shape after contacting the cold walls of the shaping mould. The moulding of the material starts at the moment the foil starts to be sucked into the pre-heated mould and ends for the respective parts of the foil when cooled by contacting the unheated mould. As the corners and edges of a shape to be deep-drawn are last to contact the walls of the mould, these portions are the most stretched ones and therefore have the smallest wall thickness of the deep-drawn container. One example of a so produced shaped container is shown in FIG. 2 of the accompanying drawings.

From West German Offenlegungsschrift No. 16 04 444 a method is known in which, for the shaping of polypropylene or polyvinyl chloride foils, individual zones of the foil are pre-heated to different degrees. First the foil edge which normally is used for clamping and then the remaining portion is heated by contacting a pre-heated heating surface. Subsequently the shaping itself takes place, the edge contributing to some extent to the extension, so that the total extension is somewhat less. Here, too, the problem arises that the corners and edges are subject to the strongest extension and therefore have the smallest wall thickness.

It is a primary object of the invention to provide an entirely novel method of producing articles by shaping thermoplastic plastics foils.

It is a further object of the invention to provide a method of shaping plastics foil into articles of desired shape having corners and edges having a wall thickness at least the same as the wall thickness of the remaining parts of the article.

It is a still further object of the invention to provide a method of shaping thermoplastic plastics foil into articles of desired shape and strength substantially reducing the amount of plastics material necessary for the production of such article of desired strength, thus reducing the cost thereof.

According to the present invention, there is provided a method of producing an article by shaping plastics foil, comprising drawing the foil, while at a temperature below its deformation temperature, into a mould cavity heated to at least the deformation temperature of the foil with the foil contacting substantially the entire wall of the mould cavity.

The heating of the foil for shaping thus takes place progressively towards the portions of smallest radius of curvature of the mould.

By using the present method, the initial foil thickness required to be used for a predetermined material thickness at the corners of the moulded article only needs to be for example half as thick as with the above conventional methods.

A further aspect of the invention provides a method of producing an article by shaping a plastics foil using heat and a fluid pressure difference, the heating of the foil for the shaping being performed progressively towards portions of the desired shape having the smallest radius of curvature.

The invention will be further described with reference to the accompanying drawings, in which:

FIG. 1 shows a longitudinal section of a deep drawing apparatus embodying the invention;

Figure 3:
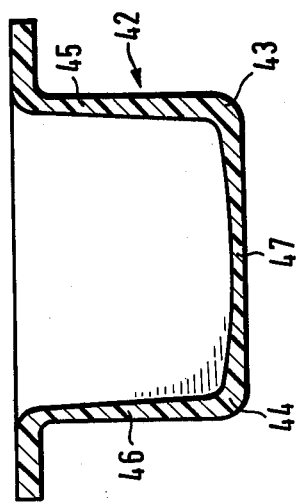
FIG. 3 is a sectional view of a packaging tray produced by a method in accordance with the invention.

FIG. 1 shows a longitudinal section through a deep drawing apparatus having an upper portion 5 and a lower portion 6. In the lower portion 6 there is provided a first rectangular chamber 7 defined by walls 19, 20, 22, 23 and the bottom 28 and an adjacent second chamber 8 defined by the bottom 28 and side walls 20, 22, 23. The upper portion 5 is provided with recesses 18, 24 opposite the chambers 7 and 8, the edges 25, 26, 27 of such recesses co-operating with the walls 19, 20, 22, 23 of the first and the second chamber in such a way that the chambers are hermetically closed.

In the first chamber 7 there is provided a bottom portion 9 with heating elements 10 which are supported in the lower portion 6 but thermally insulated therefrom and which is connected with side walls 11, 12, 21 which are of good heat-conducting material. A filling piece 13 of good heat conductivity is inserted on the bottom portion 9, the filling piece determining the required height of the space for the deep drawing. Above the latter there is arranged a matrix 14 which is also of good heat conductivity and which on its side facing the upper portion 5 has the configuration of the shape to be deep-drawn. Heating elements 10 thus heat all of the side walls and the matrix forming the bottom to a predetermined temperature at least equal to the deformation temperature of the foil.

The space enclosed by the side walls and the matrix 14 is communicable with a vacuum source or vacuum pump via a plurality of small bores 15 in the matrix, bores 16 in the side walls 11, 12, via a bore 17 in wall 19 and via a conduit which is not shown. Additionally, there is provided a bore 29 in the upper portion 5 forming a cover of the chamber 7, which bore is connectable with a source of pressurized air which is not shown.

In the second chamber 8 no heating element is provided. Directly on the bottom 28 is a filling piece 30 above which lies a matrix 31 corresponding to matrix 14. The filling piece is selected in such a way that the desired bottom level results in the space remaining above the matrix. As with the matrix 14, the matrix 31 has a plurality of bores 32 at its corners or edges through which the space formed by the side walls 20, 22, 23, through a further bore 33 in the side wall 23, is communicable with a vacuum pump which is not shown. In the zone of the upper portion 5 which acts as a cover, as in the case with the first chamber, there is provided a bore 34 which is connectable with a source of pressurized air through a conduit which is not shown.

The side walls 19, 20 and the bottom 28 are insulated with respect to heat conduction from the heatable parts in the first chamber. Flow chambers 35, 36 are provided on the bottom 28 which are connected with a refrigerant inlet conduit through a bore 37 and with a refrigerant outlet conduit through a bore 38. Thus the walls of the lower portion and the walls of the second chamber 8 may be cooled via the bottom 28. At the same time the matrix 31 is also cooled via its connection with the side walls and via the filling piece 30 with the bottom.

The shaping of the plastics foil takes place in the following manner: The foil 39 to be shaped is clamped between the edge of the walls surrounding the first chamber 7 and the corresponding edge surrounding the recess 18. Subsequently, with the foil at a temperature below its deformation temperature suction is applied to the lower surface of foil 39 through the bores 17, 16, 15 by means of a vacuum pump, the foil thereby being drawn into the chamber and taking a shape indicated by the dotted line 40. Thus, the previously unheated foil 39 contacts the upper portions of side walls 11, 12, 21 pre-heated to at least the deformation temperature of the foil and is thus heated there to a temperature which is appropriate for shaping or stretching. The foil thus stretches somewhat because of the suction acting on it. Those zones of the foil adjacent its heated zone are thus brought into contact with the heated side walls so that now these adjacent zones are heated to the shaping temperature and are extended or stretched. Finally, the foil also contacts the heated matrix 14 and takes the shape indicated by the dotted line 41. The bottom surfaces are thus also heated, and the foil stretches in this zone. As the bores 15 are arranged at the corners and edges of the matrix, i.e. at the portions of smallest radius of curvature, the foil is sucked into the corners. The foil is thus progressively heated from the walls and from the bottom in the direction towards the corner or edge and is stretched into conformity with the mould cavity. Only at the last moment the foil contacts these edge and corner zones of the matrix itself and is then momentarily heated and takes the desired shape. Obviously, the foil material in the corners and edges is only stretched to a minor extent so that in any event the wall thickness in the corners and edges is not less than in the remaining wall zones.

After this first operating step the vacuum pump is obviously shut off and the lower portion 6 of the deep drawing apparatus is lowered in the direction of arrow 41. The lowering of the lower portion 6 is performed in the usual manner to such an extent that the deep-drawn shaped product may be freely moved to the second chamber 8. The lower portion 6 is then raised in the direction of the arrow 41 and pushed against the upper portion 5.

By means of the bores 32 and 33 and a vacuum pump connected therewith, suction is applied from below to the shaped and heated foil in such a way that the foil contacts the cold walls and the bottom of the second chamber 8. The foil is thereby cooled down and is thus stabilized. At the same time, the above described shaping process is being repeated in the first mould chamber 7 with a subsequent portion of the foil. The vacuum pump connected with the bores 33 and 17 is then again shut off, the lower portion 6 is lowered and the foil is moved further towards the left-hand side in the arrangement shown in FIG. 1 out of the deep drawing apparatus and then has the stable shape 42 mentioned before.

The mould cavity of the first chamber 7 defined by the matrix and the side walls and the mould cavity in the chamber 8 defined by the side walls and the matrix may have the same size, i.e. the final size of the desired deep-drawn shape. However, in order to avoid wrinkles forming in the deep-drawn foil, the size of the first mould cavity formed by the heated walls and the matrix 14 is somewhat smaller than the size of the mould cavity in the second chamber 8. Preferably, the dimensions of the mould cavity in the first chamber are approximately from one to five per cent smaller than the dimensions of the mould cavity in the second chamber. In any event, the dimensions of the mould cavity in the second chamber correspond with those of the final desired deep-drawn mould.

It is possible to bring the foil into contact with the walls in the first and/or second chamber by using pressurized air from above as well as by suction from below. In this case, pressurized air is injected through the openings 29 or 34. If desired, suction can be applied below the foil and simultaneously compressed air can be admitted through the openings 29, 34, the compressed air uniformly acting on the foil through the recesses 18, 24.

In a modified embodiment the second chamber 8 is omitted. In this case, the method is performed by omitting the cooling step performed in this chamber; instead the moulded article is cooled down outside the apparatus e.g. by the ambient air. In this case, the size of the mould cavity of the first chamber is selected to be the same as the desired dimensions of the moulded article.

Figure 2:
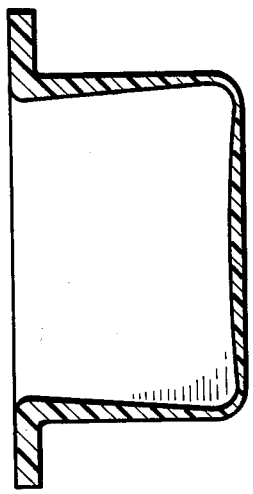
FIG. 2 is a sectional view of a packaging tray by a prior art method.

FIG. 3 shows a sectional view through a deep-drawn moulding 42 made by the above described method. It is apparent that the corners and edges 43, 44, unlike those of the conventionally made moulding of FIG. 2, are even thicker than the side walls 45, 46 and the bottom 47 of the deep-drawn foil moulding, in the embodiment shown. In order to avoid damaging of the foil on the edge of the deep-drawing mould, the edges 48, 49 of side walls forming the mould cavity of the first chamber 7 are rounded as shown in FIG. 1 so that no edges may weaken or damage the foil during the deep-drawing process.

In a further, non illustrated embodiment, the apparatus is arranged in such a way that the first heated chamber and the second, unheated chamber are not arranged side by side as shown in FIG. 1 but instead the first, heated chamber is arranged in a correspondingly formed upper portion opposite the second chamber in the lower portion. In a first operating step, without being preheated, the foil is caused to enter the mould in the first chamber by compressed air or by suction in the same way as in the above disclosed embodiment. In a second operating step the foil is then inserted into the second, unheated chamber by an oppositely acting positive or negative pressure and is there finally stabilized by being cooled. However, this modification does have certain drawbacks. In the case of composite foils, e.g. a polyethylene/polyamide composite, the polyethylene layer of the foil is heated during pulling up into the first, upper chamber. As the polyethylene layer has a lower melting point than the polyamide layer, bonding can easily occur. Further, with this method the foil must remain at the same place during two operating steps so that it can be advanced only every second operating step. With the arrangement shown in FIG. 1 and the method disclosed in connection therewith the operating speed is thus twice the speed with chambers arranged one above the other.

With the embodiment shown in FIG. 1, it is very easy to adapt the deep drawing apparatus to any desired shape and size with only a few manipulations by replacing the matrices 14, 31 and if necessary the filling pieces 30, by simply taking them out and inserting new ones.

On the contrary, where the two chambers are arranged one above another, the upper chamber, which opens downwardly must be provided with a mounting means for inserting and exchanging the filling pieces and the matrices.

The temperatures of the side walls and the matrix in the first chamber used with the method, the pressure differences applied to the foil and the dwell time in the first and second chambers depend on the foil material and are selected as a function of the material used. The deep drawing apparatus shown in FIG. 1 is part of a vacuum packaging machine. However, the method may also be used with other packaging machines.

Where a foil which is difficult to shape is used, e.g. a very thick foil, the foil may be pre-heated to a moderate temperature below the deformation temperature. To this end, in the device shown in FIG. 1, a heat radiating plate may be provided in the upper portion 5.

FIG. 1 shows an embodiment with which the foil is to be formed into a downwardly deep-drawn mould. However, with the same principle it is also possible by mere inversion of the arrangement to produce upwardly deep-drawn moulds.

The bores 15, 32 provided in the moulds of the first and second chambers are respectively arranged in the corners and edges of the above disclosed embodiment. With more complicated geometrical shapes, as usual with deep drawing apparatuses, such bores are provided at all those locations of the mould or matrix which are the last to be contacted by the foil during the deep drawing, and further at all recesses and bulges of a mould. When the foil is shaped by suction it is pulled through these bores into the corners and recesses. In case the deep drawing is performed by positive air pressure through the bores 29, 34, these bores 15, 32 are used to let air escape between the matrix and the foil so that no air cushions can form.

Figure 4:
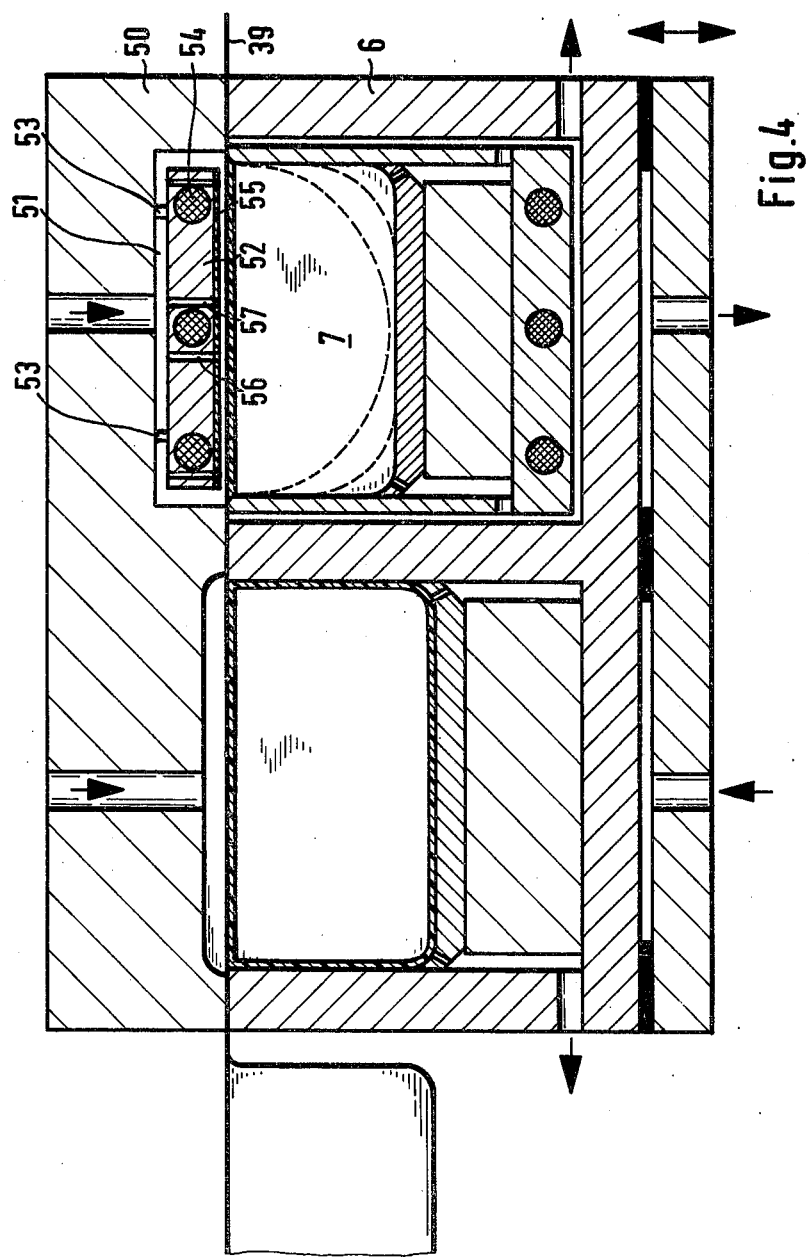
FIG. 4 is a modified embodiment of the apparatus shown in cross-section.

The embodiment shown in FIG. 4 is generally similar to that of FIG. 1, and so the following will be largely directed to the differences. The lower portion 6 is left unchanged with respect to the embodiment of FIG. 1. Only the upper portion is modified to be provided with a heating plate 52 in the recess 51 of the first chamber 7, such heating plate being rigidly fixed to the upper portion 50, e.g. by means of fastening means 53. On its lower face the heating plate is provided with a layer 55 of polytetrafluoroethylene or Teflon which avoids bonding of the heated foil 39. The heating plate is arranged in such a way that the Teflon layer will at the outset be spaced from the foil to be heated by approximately 2 mm. Bores 56, 57 are provided in the heating plate which are connected with a vacuum source. Through these bores the foil 39 will be attracted by suction to the Teflon layer in order to be heated. Heating of the heating plate is provided by heating elements 54.

With the above device the disclosed method is performed in such a way that the foil 39 to be deep-drawn is initially pre-heated in a first step by being sucked towards the heating plate 52. The foil thus achieves a temperature above room temperature, but considerably below its deformation temperature. Depending on the material, the temperature may be selected to be within the range extending from substantially 30° C. to substantially 80° C. Best results were obtained with pre-heating to a temperature between 30° C. and 40° C.

The device shown in FIG. 4 may alternatively be modified in such a way that the foil is not attracted to the heating plate, but the pre-heating of the foil is provided by radiating heat.

I claim:

1. A method for vacuum-forming from a thin-film thermoplastic material a container of the type having at least one sidewall which joins a bottom surface along at least one junction, said method comprising the steps of:

providing a mould member having an edge portion, at least one sidewall portion, and a bottom portion which together define a mould cavity with a configuration complementary to that of the container, heating said mould member to a temperature above the deformation temperature of the thermoplastic material, placing a sheet of the thermoplastic material with a temperature less than its deformation temperature over the mould member cavity, and applying a pressure differential across the thermoplastic material to draw said thermoplastic material into said cavity to effect progressive contact between the heated mould member and the thermoplastic material starting at said edge portion of the mould member and extending downwardly along the sidewall thereof toward the bottom of said mould member, said pressure differential application step further resulting in the heating of a central part of the bottom portion of the container as it contacts the mating portion of the mould member, with further deformation of the thermoplastic material occurring outwardly from said central part toward said junction of said sidewall and bottom portions, whereby the thermoplastic material is progressively heated and deformed as it progressively contacts the surfaces of the mould member.

2. A method according to claim 1, including the step of placing a sheet of thermoplastic material at substantially atmospheric temperature over said mould member cavity.

3. A method according to claim 1, including the step of placing a sheet of thermoplastic material having a temperature between 30° C. and 80° C. over said mould member cavity.

4. A method according to claim 1, including the step of placing a sheet of thermoplastic material having a temperature between 30° C. and 50° C. over said mould cavity.

5. A method according to claim 1 including the step of placing said heated, thermoplastic container into a further, non-heated mould cavity of a size larger than said heated mould cavity.

6. A method according to claim 1 including the step of applying a pressure differential across said thermoplastic, drawing said thermoplastic into contact with said non-heated mould cavity to provide a final shape for said thermoplastic container.

* * * * *